United States Patent [19]

Sabherwal

[11] 4,440,867

[45] Apr. 3, 1984

[54] CALCINED, HIGH SURFACE AREA, PARTICULATE MATTER, PROCESSES USING THIS MATTER, AND ADMIXTURES WITH OTHER AGENTS

[75] Inventor: Inderjit H. Sabherwal, Los Angeles, Calif.

[73] Assignee: Ensotech, Inc., N. Hollywood, Calif.

[21] Appl. No.: 378,081

[22] Filed: May 14, 1982

[51] Int. Cl.$^3$ .................... B01J 39/02; B01J 39/04; C02F 1/42

[52] U.S. Cl. ................... 502/62; 502/85; 502/63; 502/401; 502/80; 502/412; 502/413; 502/407; 502/416; 210/660

[58] Field of Search .............. 252/455 R, 455 Z, 430, 252/447, 432, 439, 440, 477 R

[56] References Cited

U.S. PATENT DOCUMENTS

| | | | |
|---|---|---|---|
| 3,723,351 | 3/1973 | Flank et al. | 252/455 R |
| 4,133,755 | 1/1979 | Tarao et al. | 252/430 X |
| 4,325,846 | 4/1982 | Shibata | 252/455 R |
| 4,363,749 | 12/1982 | Weiss et al. | 252/455 R |
| 4,378,306 | 3/1983 | McDaniel et al. | 252/455 R |

*Primary Examiner*—Patrick Garvin
*Attorney, Agent, or Firm*—Gene W. Arant; Michael Dufinecz

[57] ABSTRACT

This invention is concerned with production and use of high surface area particulate matter by calcining a charge of clay mineral, feldspar, zeolite, coal ash, fly ash, pozzolan or volcanic ash for a time to develop fractures which increase the surface area of the particles. Vacuum calcining decreases the calcining time. The calcined matter desirably has an analysis including: calcium oxide, about 20–40 weight %; aluminum oxide, about 15–35 weight %; and silicon oxide, about 20–40 weight %.

The calcined particulate matter can be used in the treatment of impure aqueous materials; the matter is denser than water and sludge settles rapidly and completely. The calcined matter interacts with heavy metal ions to form tightly bound sludge that is nonhazardous for landfill disposal. The calcined matter can be combined with conventual coagulants, flocculants, filter aids, or activated carbon to obtain a multipurpose treating agent.

34 Claims, No Drawings

CALCINED, HIGH SURFACE AREA, PARTICULATE MATTER, PROCESSES USING THIS MATTER, AND ADMIXTURES WITH OTHER AGENTS

BACKGROUND OF THE INVENTION

1. Field of the Invention

This invention relates to calcined, high surface area, particulate matter. More particularly, the invention relates to such matter made by a specified calcining of clay mineral, feldspar, zeolite, coal ash, fly ash, pozzolan, volcanic ash, or mixtures thereof. Also the invention relates to treating aqueous material containing inorganic, organic, or both impurities in water solution or dispersion to remove at least some of said impurities, where the treating agent is said defined particulate matter, alone or in combination with other water treating agents.

2. Description of the Prior Art

This is an era of superconsciousness of and superconcern for the total environment surrounding the human race. Not only is there concern for degradation of the environment but also a consuming desire for a return to, as closely as technology permits, a pristine condition of nature unspoiled by human intrusion.

This desire for purity is especially strong in the field of water, resulting in efforts to get industry to return waste water to nature purer than the original raw water. Even rain water has become the subject of scrutiny, e.g., acid rain.

The treatment of sewage is an old art, with primary treatment to remove suspended particles above colloidal size; secondary treatment to remove dissolved material and/or colloidal matter; and tertiary treatment such as removal of organic materials escaping the secondary treatment. "Sludge" is produced by sewage treatment in such vast quantities that disposal has become a major headache. Landfill is most commonly used by inland communities, but landfill has its own problems, such as, odors, toxic gases released to the atmosphere, and leaching of the sludge by rain and surface water, followed by seepage of such leach water underground into ground water sources may, and often does, result in serious pollution situations with respect to potable water.

Industrial waste water presents a unique problem for each type of industry, e.g., steel mill waste water; sulfite paper pulp production; paper mill white water; petroleum refining which produces water soluble as well as water insoluble hydrocarbonaceous wastes; the acid water escaping from coal mines; etc. A difficult problem exists in the waste water from the metal plating industry and metal finishing industry because the heavy metal ions in the waste water are toxic to life and must be essentially completely removed to prevent contamination of ground water by seepage from ponds or lagoons containing such liquid waste containing complexed heavy metal ions or concentrates of such. Plastic liners are not really satisfactory answers to such seepage.

Organic polyelectrolytes are often excellent flocculating agents for dispersed material impurity, but generally such flocs have an expensively slow settling rate. A floculent with rapid settling properties is much sought after. A flocculant with chemisorption property to remove dissolved ions, especially heavy metal ions, is especially sought after.

Special compounds are being used in certain water involved industries to improve their product or the quality of the "waste water". Hydrazine is used to scavenge dissolved oxygen from boiler feed water, but hydrazine is toxic and its use severely regulated. Wood pulp bleaching, clay bleaching, and heavy metal ion waste water use borohydride, even though this expensive agent is unstable at the conditions normally existing in these aqueous media, forcing the use of a large excess of the agent; furthermore, this agent may introduce toxic boron into water supplies.

Dithionite is effective in reducing metal ions in aqueous solution to the metals, or hexavalent chromium to trivalent chromium. Acid medium interferes with the activity of the dithionite. The use of dithionite in wood pulp bleaching is impeded by the acidity of that medium. Dithionite in the moist condition is extremely unstable in storage; it can explode releasing toxic sulfur oxides. Also when dithionite contacts organic material and/or acids, a high explosive is formed which also releases toxic gases.

SUMMARY OF THE INVENTION

Process for producing calcined, high surface area, particulate matter.

The process for producing high surface area particulate matter comprises: calcining, feed particulate matter selected from the group consisting of clay mineral, feldspar, zeolite, coal ash, fly ash, pozzolan, volcanic ash and mixtures thereof, at a temperature above about 1100° C., for a time sufficient to develop fractures extending from the surface of the calcined particulate matter which fractures increase substantially the surface area of the calcined particulate matter over that of the feed particulate matter. Desirably, the clay mineral is natural bentonite or chemically modified bentonite; preferably it is calcium bentonite. Fly ash is another preferred feed. Desirably, the clay mineral, feldspar, or zeolite feed is heated at about 1000°–1400° C. to expel volatile material before being subjected to the calcining procedure. Preferably the feed includes, naturally present or in added form, material which is volatile or combustible at the calcining temperature. The product calcined particulate matter, desirably, has an analysis consisting essentially of: calcium, as oxide, about 20–40 weight %; preferably about 26–33 weight %; aluminum, as oxide, about 15–35 weight %; preferably, about 23–26 weight %; silicon, as oxide, about 20–40 weight %; preferably about 37–40 weight %. Typically the calcined particulate matter has an apparent density of above about 2.3 and has a pH, when 1 g is dispersed in 100 ml of deionized water, of at least about 10, typically above about 11. The calcining can be carried out at about atmospheric pressure (that is, 760 mm Hg) or at substantially less than atmospheric pressure, desirably less than about 25 mm Hg, at which vacuum, the calcining time is on the order of 5–30 minutes, at about 1500° C. The preferred calcining temperature is above about 1500° C. Desirably the calcined product analysis includes: combustibles, not more than 1 weight %; and sulfur materials, as "S", not more than about 0.5 weight %.

Calcined particulate matter.

The calcined, high surface area, particulate matter of the invention is the product of the aforesaid calcining procedure applied to feed particulate clay mineral, feldspar, zeolite, coal ash, fly ash, pozzolan or volcanic ash. Preferred feeds are clay mineral, especially calcium bentonite, and fly ash.

Treatment process for water, wet sludge and wet solid waste.

The treatment process of the invention comprises: contacting aqueous material at a pH above about 6, preferably about 7, with calcium particulate matter produced by the procedure e summarized aforesaid. Said aqueous material contains organic, inorganic, or both impurity in water solution, water dispersion, or both, whereby at least a significant amount of said impurity is removed by interaction of said impurity with said calcined particulate matter. Particular aqueous materials are: Hard water. Waste water, such as, sewage after primary treatment; metal plating and metal finishing waste water; paper mill white water. Wet solid waste or soil or both, having a substantial free water content and including inorganic, organic or both impurity.

Particulate composition adapted for treatment of aqueous material

The particulate composition is adapted for treatment of the aforedefined aqueous material and consists essentially of calcined particulate matter produced by the aforesaid summarized procedure in combination with at least one member of the group consisting of coagulants, flocculants, filter aids and activated carbon. Diatomaceous earth (diatomite) is a preferred filter aid. Organic polyelectrolytes are preferred flocculants.

Particulate composition of calcined particulate matter in combination with certain "exotic" agents.

The exotic particulate composition consists essentially of a combination of calcined particulate matter produced by the aforesaid summarized procedure with at least one member of the group consisting of borohydrides; dialkyldithiocarbamates where alkyl has 1-5 carbon atoms and 'carbamate' has alkali metal or ammonium; dithionites; glycine; hydrazine salts; metabisulfites; polygalacturonic acid; water soluble sulfides and sulfites; and cellulose and starch xanthates. The particulate composition may include coagulant, flocculants, filter aids or activated carbon. Preferred calcined particulate matter is derived from calcium bentonite or fly ash. Specific exotic agents are alkali metal borohydride; alkali metal dithionite; alkali metal metabisulfite and alkali metal dialkyldithiocarbamate as defined above.

DETAILED DESCRIPTION

Feed particulate matter

The feed particulate matter charged to the calcining procedure of this invention is one of, or a mixture of two or more, of the group: clay mineral, feldspar, zeolite, coal ash, fly ash, pozzolan and volcanic ash. Desirably mixtures fall into two subgroups: (1) clay mineral, feldspar and zeolite and (2) coal ash, fly ash, pozzolan and volcanic ash.

The clay minerals are hydrated silicates of aluminum, iron or magnesium, along with small to minor amounts of other chemical elements, particularly the alkali metals, alkaline earth metals and heavy metals. These other chemical elements include fluorine, phosphorus, sodium, potassium, lithium, calcium, barium, zinc, titanium, manganese, copper, nickel, cobalt and chromium. The clay minerals include the natural and the synthetic minerals. The clay minerals are divided in classes based on mineralogical, physical, thermal and technological properties. These classes are: (1) kaolins, (2) serpentines, (3) smectites, (4) illites (micas), (5) glauconite, (6) attapulgite and sepiolite, (7) mixed clay minerals, (8) amorphous clays: allophane and imogolite, (9) high alumina clay minerals. Bentonite is rich in the smectite clay mineral: montmorillonite. Bentonite occurs naturally in two types: sodium bentonite where sodium is the dominant other metal, and calcium bentonite where calcium is the dominant other metal. Bentonite is available in chemically modified forms, which are suitable feed to this process. Calcium bentonite is a preferred feed particulate matter. (Reference: Kirk-Othmer, Encyclopedia of Chemical Technology, 3rd Edition, Volume 6, Clays, Survey)

As used herein, feldspar is the general name given to a group of sodium, potassium, calcium and barium aluminum silicates. Commercial feldspar is usually the potassium type: $K_2O.Al_2O_3.6SiO_2$; normally some sodium is present.

As used herein, zeolite refers to natural or synthetic hydrated silicates of aluminum, including the metals sodium or calcium or both, such as, $Na_2O.2Al_2O_3.5SiO_2.xH_2O$ and $CaO.2Al_2O_3.5SiO_2.xH_2O$.

As used herein, the term "ash" includes the residue from the incineration of organic solid waste, organic sludges (particularly sludges from treatment of sewage with calcined particulate matter), wood and wood products, coal and coke. Coal ash and coal fly ash refer to the incombustible mineral residue remaining after coal has been burned more or less completely. Fly ash is the fine ash or flue dust carried by the gaseous combustion products of pulverized coal plants. (Reference for compositions of typical coal fly ashes: Aluminum from Fly Ash. K. Felker, F. Seeley, Z. Egan and D. Kelmers. CHEMTECH, February 1982). Coal ash is the incombustible mineral residue remaining after coal or coke has been burned in a furnace; the ash may be withdrawn as the solid from an ash pit or withdrawn as fused ash and then cooled to the solid ash. Ash properties of typical coals appear in Kirk-Othmer, ibid, Vol. 11, Furnaces, fuel fired, table 4, page 572, and has handling at pages 572-574. Coal fly ash is a particularly preferred feed particulate matter.

Volcanic ash is a fine rock composed of fragmented volcanic products ejected from volcanos in explosive events (pyroclastic rock), or ejected in the form of volcanic mud, or ejected by way of pyroclastic flow.

As used herein, pozzolan is a natural or artifical mixture of volcanic ash and siliceous material, such as, diatomite (diatomaceous earth, kieselguhr).

Desirable and Preferred Feed

It is desirable that the calcined particulate matter have a chemical analysis consisting essentially of (a) calcium, as oxide, about 20-40 weight %; (b) aluminum, as oxide, about 15-35 weight % and (c) silicon, as oxide, about 20-40 weight %. All percentages are based on calcined product.

It is preferred that the calcined particulate matter have a chemical analysis consisting essentially of (1) calcium, as oxide about 26-33 weight %; (2) aluminum, as oxide, about 23–26 weight %; and (3) silicon, as oxide, about 37–40 weight %.

It is to be understood that in addition to the named calcium, aluminum and silicon, the particulate matter includes other chemical elements, typical of the particular particulate matter.

If the particular feed particulate matter is deficient in any one of said calcium, aluminum, or silicon, the charge to the calcining is modified by including added (extraneous) material rich in the deficient element(s). For example, calcium carbonate could be added; silicate chemical could be added; aluminum hydroxide could be added.

It has been found that the calcined particulate matter is improved in quality in the various utilities for which it is suitable, if the charge to the calcining procedure includes material which is volatilizable or combustible at the calcining temperature. This volatilizable/combustible material may be naturally present in the feed particulate matter or an extraneous component of the charge. Illustrations of such extraneous volatilizable/combustible materials are: carbon in any of its forms, such as, coal, coke, wood, paper, straw, organic sludge. Sulfur, itself, or any of its compounds, such as, sulfur oxides, sulfides. Carbonates, such as alkali metal or alkaline earth metal carbonates and bicarbonates. Water can be a volatizable component of the charge. The aforesaid listing is not limiting with respect to suitable volatizable/combustible materials for use in the calcining procedure of the invention.

In the case of clay mineral, feldspar or zeolite feed particulate matter, it may be desirable to heat said feed particulate matter to expel volatile material before subjecting said feed to the calcining procedure. Suitable temperature for this pretreatment fall within the range of about 1000°–1400° C.

Calcined Particulate Matter

The calcining procedure develops fractures in the calcined particulate matter, extending from the surface in the direction of the interior—demonstrated by photomicrographs of sectioned particles. The fractures increase substantially, and typically show a great increase, the surface area of the calcined particles as compared to the feed particles. It is desirable that the calcining procedure continue until a maximum number, for the particular feed, of fractures or length of fractures, have developed. The larger the surface area per average particle, the more effective the calcined particulate matter is for the utilities thereof.

The calcined particulate matter has an apparent density well above 1.0, depending on the particular feed. It has been observed that usually, the apparent density is above about 2.3, and typically above about 2.5.

Desirably the calcined particulate matter has an analysis consisting essentially of:
 calcium, as oxide, about 20–40 weight %;
 aluminum, as oxide, about 15–35 weight %; and
 silicon, as oxide, about 20–40 weight %.

Preferably, the calcined particulate matter has an analysis consisting essentially of:
 calcium, as oxide, about 26–33 weight %;
 aluminum, as oxide, about 23–26 weight %; and
 silicon, as oxide, about 37–40 weight %.

The calcined particulate matter tends to show an alkaline pH when dispersed in deionized water. Calcined particulate matter of aforesaid calcium, aluminum, and silicon preferred content has a pH, when dispersed in deionized water, of at least about 10, and typically is above about 11. This pH is determined after dispersing one gram of calcined particulate matter in 100 ml of deionized water.

The organic materials which on incineration produce ash, either furnace ash or fly ash, normally produce such ash containing both combustibles and sulfur material, calculated as "S". It is desirable to control the calcining of ash from organic materials to contain in the calcined particulate matter: combustibles, not more than about 1 weight %; and sulfur materials, as "S", not more than about 0.5 weight %. Although the combustibles/S content is not as prevalent with other calcined particulate matter, it has been found desirable to place the aforesaid combustible/ S content on all calcined particulate matter. It is to be understood that not all utilities of the calcined particulate matter of this invention need control of such combustible and/or sulfur content; therefore, these limitations are not applicable across the board.

Calcining Conditions

The feed particulate matter is calcined at a temperature above about 1100° C. for a time sufficient to develop fractures extending from the surface of the calcined particle to the interior thereof. These fractures increase substantially the surface area of the calcined particle over that of (the surface area of) the feed particle. Typically temperature and time are controlled to attain the maximum number of fractures and surface area for the particular feed particulate matter.

In general, the preferred calcining temperature is above about 1500° C. This temperature can vary somewhat with the particular feed particulate matter.

It has been observed that when added (extraneous) volatizable material is present in the charge to the calcining, it is necessary to operate at a somewhat higher temperature (other conditions being equal) than when the volatilizable material is a natural part of the feed particulate matter, in order to obtain a calcined product of about equal quality.

Also it has been observed that the presence of volatizable material in the charge has a favorable influence on the degree of fracturing, at a given temperature/time/pressure condition, of calcining.

A preferred mode of operation involves a two stage heating wherein (1) fly ash is passed from a kiln to (2) a calciner for production of calcined fly ash.

Atmospheric pressure calcining

The calcining procedure when operating at ambient atmospheric pressure, i.e., substantially 760 mm Hg, produces calcined particulate matter suitable for the utilities of calcined particulate matter. To illustrate: Feed coal fly ash calcined at about 1500° C., at about 760 mm Hg, for about 3 hours results in a calcined fly ash having a greatly increased surface area, compared to the feed fly ash, and suitable for any of the utilities given herein.

Subatmospheric pressure calcining

At a given temperature, the calcining time is markedly decreased by operating the calciner at subatmospheric pressure. Desirably, the calciner operates at a vacuum of less than about 25 mm Hg. Under these vacuum conditions, at about 1500° C., the calcining time is on the order of 5–30 minutes. To illustrate: Feed coal fly ash calcined at about 1500° C., at about 10 mm Hg, for about 15 minutes, is converted to calcined fly ash having a greatly increased surface area, suitable for any of the utilities given herein. The vacuum procedure is desirable with zeolite feed because of the generally lower fusion temperatures of zeolites.

Treatment Process for Water, Wet Sludge and Wet Solid Waste

Aqueous Materials

The aqueous material feed to the "water" treatment process of the invention contains (includes) inorganic, organic or both impurity, which impurity is in water solution, water dispersion (suspension). or both conditions. Specific illustrations of aqueous materials appear herein below; these illustrations are not limiting.

Water treatment is concerned with the purification of water to make it suitable for drinking or for any other use. Hard water contains objectionable amounts of metal ions, typically, calcium and magnesium, and acidic ions may be present. Waste water is dirty water from domestic, industrial and mining use. Sewage is the spent water supply of a community; primary treatment consists of the removal of particles above colloidal size; secondary treatment involves removal of colloidal or dissolved materials; tertiary treatment involves chemical precipitation of dissolved or suspended materials. Wet soil and mud proceed from the self evident water is present condition to the soft, sticky mud condition. Plating, electro and nonelectro, waste water, metal finishing waste water, and to some extent, tannery waste water consist of water solutions of heavy metal ions, such metals as, Ag, Al, Au, Cd, Co, Cr, Cu, Fe, Ni, Pb, Pt, Sn and Zn. These plating waste waters are generally in a low acidic condition. The paper pulp and paper mills (white water) produce waste water contaminated by organic materials.

A particular use is with the wet soil or mud lining an excavation or natural depression—the wall thereof—which is to form a waste water lagoon or pond. In another mode, a dry excavation may be lined by gunning or layering a mixture of wet soil or clay and calcined particulate matter onto the dry surface to form a wall thereon, as in the wet soil lining situation. Or, dry soil or clay can be admixed with calcined particulate matter and positioned on the sides and bottom of an excavation or depression; rain and other water than can naturally wet the mixture to form the wall of the lagoon or pond.

Treatment and observed results

The treatment process of this invention utilizes the calcined particulate matter aforedefined, and the combinations as defined herein, on the defined aqueous materials.

The effectiveness for treating water is strikingly demonstrated with hard water containing metal ions. Calcined particulate matter is intermingled with the hard water, in say a beaker, the sediment formed settles rapidly and is decanted or filtered off. Before the introduction of the calcined matter, the electrical conductivity of the hard water was measured. The electrical conductivity of the clear treated water is measured. A change in electrical resistance is invariably evident; the higher resistance demonstrates removal of dissolved solids. It has been observed that sulfate ions, chloride ions, and phosphate ions are removed as well as metal ions.

In treating waste water with calcined particulate matter, the rate of settling of the sediment (precipitate) formed is much, much greater than the rate of settling when using only coagulants and flocculants; organic polyelectrolytes are extremely slow settling. It has been observed that many dissolved organic and inorganic material impurities also interact with the calcined particulate matter and are removed from the water portion of the waste water. There is evidence that ion exchange interactions occur with some of the dissolved metal ions, which are removed from solution and pass out of the water along with the calcined particulate matter as precipitate or sludge.

The treatment process is effective with chromate waste water. However, it is best used in connection with polishing clean up of such waste water, because the calcined particulate matter is effective just where the conventional procedures are largely ineffective.

It has been observed that the dominant activity of the calcined particulate matter is determined by the pH of the aqueous medium portion of the waste material being treated. It appears that at pH less than 7, the main activity is ion exchange; and at pH greater than 7, the main activity is flocculation.

Organic polyelectrolytes aid in the settling of suspended solids. However, this floc when acted on by shear forces, such as in centrifuging, reverses and returns the settled solids to the colloidal state. Ordinarily, addition of more polyelectrolyte to the reversed aqueous material will not result in reprecipitation. On the other hand, the precipitate (sludge) obtained with calcined particulate matter alone, or in combination with organic polyelectrolyte, is substantially resistant to shear forces and does not reverse state.

It has been observed that the metals taken up by the calcined particulate matter do not leach out at a pH of 5.4 (E.P.A. Test). Apparently as long as the surrounding acidity will not attack the silicate structure of the calcined matter, the metals remain bound. This non-leaching property eliminates the need to send calcined particulate matter sludge to a Class I landfill. This ia a singular benefit over conventional flocculants and coagulants, which sludges cannot be sent to non-hazardous landfills.

It has been observed that calcined particulate matter adsorbs organic liquids, such as, hydrocarbons and detergents. These are taken up from aqueous suspensions, and precipitated with the solid calcined particulate matter, and removed as solid sediment or sludge. However, the other beneficial properties of the calcined particulate matter are poisoned by these adsorbates.

In connection with protective walls for waste water lagoons and ponds: In some situations, dry calcined particulate matter is positioned on dry or wet banks and bottom of the excavation or depression that is to be become a lagoon or pond—a thickness of 6 inches may be laid down. The thickness is permitted to be wet by rain and surface water and even waste water; the calcined matter layer becomes hard and rigid, but pervious to water seepage.

Whether the protective wall of a lagoon or pond is formed by mixing calcined particulate matter with the wet soil; positioning a mixture of calcined matter and soil on the lagoon-to-be-wall; positioning a layer of dry calcined matter on the lagoon-to-be-wall; or any variant of these, the wall becomes hard, rigid and reasonably strong. The wall is not impervious, unlike concrete. The wall is permeable to seepage of more or less pure water to the underlying soil.

Contaminated underground water reservoir

Contaminated water from an underground reservoir may be pumped out. This water may be alkalized, if need be. Then it is treated with calcined particulate matter; the sludge is removed and the treated water further treated to remove impurity not removable by the calcined matter. The treated water can be discharged to sewers beyond community treating plant limits to eliminate further unnecessary treatment, or used for irrigation, or industrial safe-to-health uses, or even returned to the reservoir to dilute the contaminated water and eventually to have only noncontaminated treated water therein, i.e., in a safe condition. Illustrative of such contaminated underground water reservoirs are reservoirs contaminated by seepage containing nonbiodegradable detergents. Other reservoirs are contaminated from seepage of aerobic spraying on 'sun-plains' of sewage for sun purification.

Calcined Particulate Matter Combined with Certain Water Treating Agents

Any of the aforesaid calcined particulate matter can be combined with certain water treating agents to improve removal of impurities from aqueous materials. The calcined particulate matter is especially effective when combined with coagulants and/or flocculants; with filter aids and/or activated carbon. Filter aids, such as diatomite (diatomaceous earth, kieselguhr) are good to improve oil cleanup from dispersion in aqueous media. Activated carbon is good for removal of phenolics and color bodies. When organic polyelectrolyte is part of the combination, about 1-3 weight % of the polyelectrolyte is present. Calcined calcium bentonite and calcined fly ash are preferred for these combinations.

Calcined Particulate Matter Combinations with Specific Compounds for Special Uses It has been discovered that certain "exotic compounds" are advantageously incorporated with the calcined particulate matter of the invention for treating aqueous media.

Calcined calcium bentonite and calcined fly ash are preferred for the exotic combinations.

Herein the incorporated calcined particulate matter and the exotic compound are described as a combination. However, the properties of the combinations are more than the components added together. This leads to the supposition that the combination is more in the nature of a chemical mixture, such as, adduct or complex. Nonetheless, these incorporations will be referred to herein as "combinations".

The combination components

The exotic component is a member of the group consisting of borohydrides; dialkyldithiocarbamates where alkyl has 1-5 carbon atoms and 'carbamate' has alkali metal or ammonium; dithionites; glycine; hydrazine salts; metabisulfites; polygalacturonic acid; water soluble sulfides and sulfites; and cellulose and starch xanthates.

The combination may include coagulants, flocculants, filter aids, or activated carbon. Organic polyelectrolytes are preferred flocculants. Papermakers alum (aluminum sulfate) and potassium aluminum sulfate are preferred inorganic coagulants. Diatomite is a preferred filter aid.

Borohydrides

Borohydrides (tetrahydroborates) are the metal salts $M[BH_4]$ where M is almost any metal. The alkali metal borohydrides are preferred. The borohydride of commerce is the sodium salt, $NaBH_4$. Borohydride is used in wood pulp bleaching, clay bleaching and removal of heavy metals from waste water; it is particularly useful for removal of lead and mercury ions. A prominent use is the recovery of silver from waste photographic solutions. Borohydride has the drawback that the acid pH of the aqueous environments where borohydride would be most useful, the borohydride rapidly decomposes and large excess of the borohydride must be added to obtain the desired result.

The combination of calcined particulate matter and exotic agent, such as, borohydride, is obtained by intermingling the two solids, or by impregnation of the calcined matter with a concentrated water solution of borohydride, or intermingling with a water slurry of solid borohydride.

It has been observed that when the combination is added to those aqueous environments where borohydride is useful, the borohydride in the combination very slowly decomposes, giving the desired result at more nearly the theoretical requirement. In addition the calcined particulate matter provides benefits with respect to other impurities present in the aqueous environment.

Dialkyldithiocarbamates

The dialkyldithiocarbamates utilized in this invention are the dialkyldithiocarbamic acid salts $R_2NCSSM$ where R is alkyl having 1-5 carbon atoms and Mi is alkali metal or ammonium. Herein M is also referred to as "carbamate" portion of the compound. These salts precipitate heavy metal ions from aqueous solution. These are very effective when precipitation from alkaline medium is difficult.

Dithionites

Dithionites are salts of dithionous acid (hydrosulfurous acid), $H_2S_2O_4$, and previously were addressed as hydrosulfites. The most readily available salts are the alkali metal salts and the zinc salt. These dithionites are powerful reducing agents, readily reducing most metal ions to the metal, as in chromate waste water. The dithionites are also used in bleaching wood pulp. However, the dithionites are unstable in the aqueous environments where they would be useful; the problems resulting from this lack of stability, under these conditions, have been mentioned earlier herein.

The combination of calcined particulate matter and dithionite is much more stable than dithionite alone. In the pulp bleaching, the drop out materials, which are not removable by organic polyelectrolyte, can be recovered and the pulp content can be recycled.

Glycine

Glycine (aminoacetic acid) is the simplest amino acid. It is used as a modifier of urea-formaldehyde resins in the preparation of improved wet strength paper, where the UF resin is precipitated onto the paper pulp by alum. The combination of calcined particulate matter provides a better modifier activity for this UF resin application.

Hydrazine Salts

A serious problem with the use of hydrazine or hydrazine salts in alkaline aqueous medium is the production of toxic endproducts. A particular use for hydrazine salts, such as, hydrazine sulfate and hydrazine chloride, is the removal of hexavalent chromium ion from strong alkaline aqueous solution. The combination of calcined particulate matter and hydrazine salt does not release hydrazine and does not form toxic endproducts when used in the strong alkaline aqueous metal waste water medium. The dense calcined particulate matter sludge settles rapidly and is easily removed from the treated water.

Metabisulfites

The salts of pyrosulfurous acid, $H_2S_2O_5$, are named as pyrosulfites. Commercially they are known as metabisulfites, $M_2S_2O_5$. The sodium salt, and the other alkali metal salts, are used in improving the wet strength of paper by the urea-formaldehyde process. Also the metabisulfites are low cost reducing agents, very effective in chrome waste water treatment. The calcined particulate matter/metabisulfite combination is more effective in chrome waste water treatment than the metabisulfite alone, particularly at the polishing end of the treatment.

Polygalacturonic acid

Polygalacturonic acid forms water insoluble complexes with heavy metals. These 'metal sludges' have toxic properties if leached from landfill or from lagoon disposal sites into water supplies. The calcined particulate matter/polygalacturonic acid combination provides a "nontoxic sludge" which is not leached and so can be safely disposed of in landfill or lagoon sites.

Water Soluble Sulfides and Sulfites Cellulose and Starch Xanthates

These water soluble sulfides and sulfites, cellulose and starch xanthates form insoluble precipitates with heavy metal ions, under controlled conditions. However, these sludges are difficult to settle even with the aid of organic polyelectrolyte. Also these agents form odorous and even toxic sludges; the agents themselves are somewhat toxic. All these agents and their sludges require E.P.A. Class I landfills for disposal. The calcined particulate matter/agent of this section combination forms a precipitate which settles rapidly and binds the metal and agent so tightly that E.P.A. Class I landfill disposal is not necessary. Furthermore, there is no odor problem with the sludge from the combination treatment.

Thus having described the invention, what is claimed is:

1. A process for producing high surface area particulate matter, which process comprises:
   calcining, a charge of
   feed particulate matter selected from the group consisting of clay mineral, feldspar, zeolite, coal ash, fly ash, pozzolan and volcanic ash,
   at a temperature above about 1100° C.,
   for a time sufficient to develop fractures extending from the surface of the calcined particulate matter, which fractures increase substantially the surface area of the calcined particulate matter over the surface area of said feed particulate matter.

2. The process of claim 1 wherein said charge includes, as naturally present in said feed particulate matter or in added form, material which is volatilizable or combustible at the calcining temperature.

3. The process of claim 1 wherein said calcined particulate matter has an analysis consisting essentially of:
   calcium, as oxide, about 20–40 weight %;
   aluminum, as oxide, about 15–35 weight %; and
   silicon, as oxide, about 20–40 weight %.

4. The process of claim 1 wherein said feed clay mineral, feldspar or zeolite is heated to about 1000°–1400° C. to expel volatile material before being subjected to said calcining procedure.

5. The process of claim 1 wherein said feed clay mineral is natural bentonite or chemically modified bentonite.

6. The process of claim 5 wherein said bentonite ic calcium bentonite.

7. The process of claim 1 wherein said feed particulate matter is fly ash.

8. The process of claim 1 wherein said calcining temperature is above about 1500° C. and the calcination is carried out at about atmospheric presssure.

9. The process of claim 1 wherein the calcination is carried out at substantially less than atmospheric pressure.

10. The process of claim 9 wherein said subatmospheric pressure is less than about 25 mm Hg.

11. The process of claim 10 wherein said temperature is above about 1500° C. and the calcining time is on the order of 5–30 minutes.

12. The process of claim 1 wherein said calcined particulate matter has an analysis consisting essentially of:
   calcium, as oxide, about 26–33 weight %;
   aluminum, as oxide, about 23–26 weight %; and
   silicon, as oxide, about 37–40 weight %.

13. The process of claim 12 wherein said calcined particulate matter has an apparent density of above about 2.3 and has a pH, when 1 g is dispersed in 100 ml of deionized water, of at least about 10.

14. The process of claim 12 wherein said calcined particulate matter has an analysis including: combustibles, not more than about 1 weight %; and sulfur materials, as "S", not more than 0.5 weight %.

15. Particulate matter selected from the group consisting of clay mineral, feldspar, zeolite, coal ash, fly ash, pozzolan and volcanic ash produced by the process of claim 1.

16. Particulate matter of claim 15 where the calcined particulate matter of the process of claim 1 has an analysis consisting essentially of:
   calcium, as oxide, about 20–40 weight %;
   aluminum, as oxide, about 15–35 weight %; and
   silicon, as oxide, about 20–40 weight %.

17. Particulate matter of claim 16 wherein said clay mineral is calcium bentonite.

18. Particulate matter of claim 16 wherein said feed particulate matter is fly ash.

19. Particulate matter produced by
   calcining feed fly ash charge;
   at a temperature of above about 1500° C.;
   for a time sufficient to develop fractures extending from the surface of said calcined fly ash, which fractures increase substantially the surface area of the calcined fly ash over that of the feed fly ash;
   the calcined fly ash has an apparent density of above about 2.3, has a pH, when 1 g is dispersed in 100 ml of deionized water, of at least about 10; and
   has an analysis consisting essentially of:
   calcium, as oxide, about 20–40 weight %;
   aluminum, as oxide, about 15–35 weight %; and
   silicon, as oxide, about 20–40 weight %.

20. The calcined fly ash particulate matter of claim 19 which has an analysis including:
  combustibles, not more than 1 weight %; and
  sulfur materials, as "S", not more than about 0.5 weight %.

21. A particulate composition adapted for treatment of impure aqueous material, which composition consists essentially of:
  (1) particulate matter produced by process comprising:
    calcining, a charge of
    feed particulate matter selected from the group consisting of clay mineral, feldspar, zeolite, coal ash, fly ash, pozzolan, and volcanic ash;
    at a temperature above about 1100° C;
    for a time sufficient to develop fractures extending from the surface of said particulate matter;
    which fractures increase substantially the surface area of the calcined particulate matter over that of the feed particulate matter;
  in combination with
  (2) at least one member of the group consisting of coagulants, flocculants, filter aids and activated carbon.

22. The composition of claim 21 wherein said feed particulate matter is calcium bentonite.

23. The composition of claim 21 wherein said feed particulate matter is fly ash.

24. The composition of claim 21 wherein said calcined particulate matter is combined with organic polyelectrolyte.

25. A particulate composition adapted for treatment of impure aqueous material, which composition consists essentially of:
  (1) calcined fly ash produced by the process comprising:
    calcining, a charge of coal fly ash;
    at a temperature above about 1500° C.;
    for a time sufficient to develop fractures extending from the surface of the calcined fly ash particles, which fractures increase substantially the surface area of the caclined fly ash over that of feed fly ash;
    the calcined fly ash has an apparent density of above about 2.3, and has a pH, when 1 g is dispersed in 100 ml of deionized water, of at least about 10;
    has an analysis consisting essentially of:
      calcium, as oxide, about 26-33 weight %;
      aluminum, as oxide, about 23-26 weight %; and
      silicon, as oxide, about 37-40 weight %; and
    has an analysis including:
      combustibles, not more than 1 weight %; and
      sulfur materials, as "S", not more than about 0.5 weight %;
  in combination with
  (2) at least one member selected from the group consisting of coagulants, flocculants, filter aids, and activated carbon.

26. A particulate composition consisting essentially of:
  (1) particulate matter produced by the process comprising:
    calcining a charge of
    feed particulate matter selected from the gorup consisting of clay mineral, feldspar, zeolite, coal ash, fly ash, pozzolan, and volcanic ash;
    at a temperature above about 1100° C.;
    for a time sufficient to develop fractures extending from the surface of said calcined particulate matter,
    which fractures increase substantially the surface area of the calcined particulate matter over that of the feed particulate matter;
  in combination with
  (2) a member of the group consisting of borohydrides, alkali metal or ammonium dialkyldithiocarbamates where aklyl has 1-5 carbon atoms and dithionites, glycine, hydrazine, salts, metabisulfites, polygalacturonic acid, water soluble sulfides and sulfites, and cellulose and starch xanthates.

27. The composition of claim 26 wherein said particulate matter is calcium bentonite.

28. The composition of claim 26 wherein said particulate matter is fly ash.

29. The composition of claim 26 wherein said member is alkali metal borohydride.

30. The composition of claim 26 wherein said member is alkali metal dithionite.

31. The composition of claim 26 wherein said member is alkali metal metabisulfite.

32. The composition of claim 26 wherein said composition includes at least one of the group consisting of coagulants, flocculents, filter aids and activated carbon.

33. A particulate composition consisting essentially of:
  (1) calcined fly ash produced by the process comprising:
    calcining coal fly ash charge;
    at a temperature above about 1500° C.:
    for a time sufficient to develop fractures extending from the surface of the calcined fly ash particles, which fractures increase substantially the surface are of the calcined fly ash over that of feed fly ash;
    the calcined fly ash has an apparent density of above about 2.3, has a pH, when 1 g is dispersed in 100 ml of deionized water, of at least about 10;
    has an analysis consisting essentially of:
      calcium, as oxide, about 26-33 weight %;
      aluminum, as oxide, about 23-26 weight %; and
      silicon, as oxide, about 37-40 weight %; and
    has an analysis including:
      combustibles, not more than about 1 weight %; and
      sulfur materials, as "S", not more than about 0.5 weight %;
  in combination with
  (2) a member of the group consisting of borohydrides, alkali metal or ammonium dialklyldithiocarbamates where alklyl has 1-5 carbon atoms or dithionites, glycine, hydrazine salts, metabisulfites, polygalacturonic acid, water soluble sulfides and sulfites, and cellulose and starch xanthates.

34. The composition of claim 33 wherein said composition includes at least one of the group consisting of coagulants, flocculants, filter aids, and activated carbon.

* * * * *